May 13, 1952   J. V. FREDD   2,596,924
TUBING CALIPER WITH LATCH MEANS
Filed June 9, 1949   8 Sheets-Sheet 1
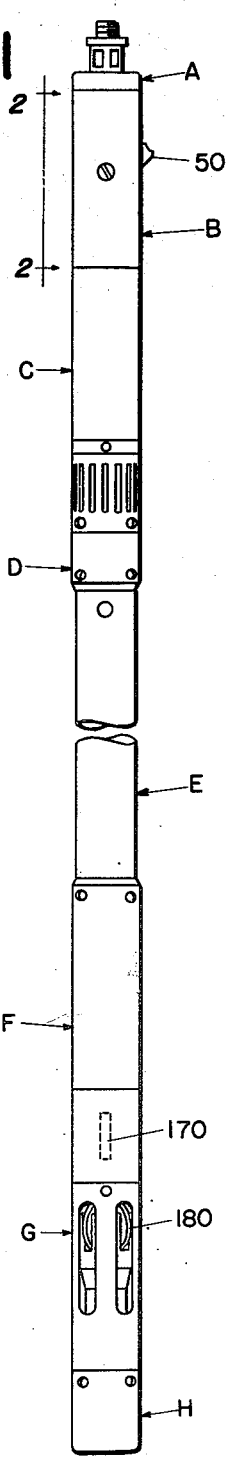
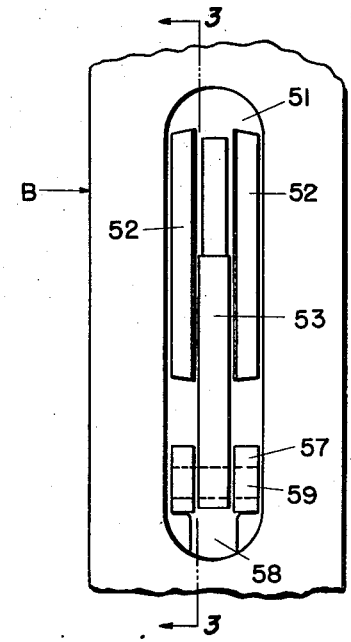
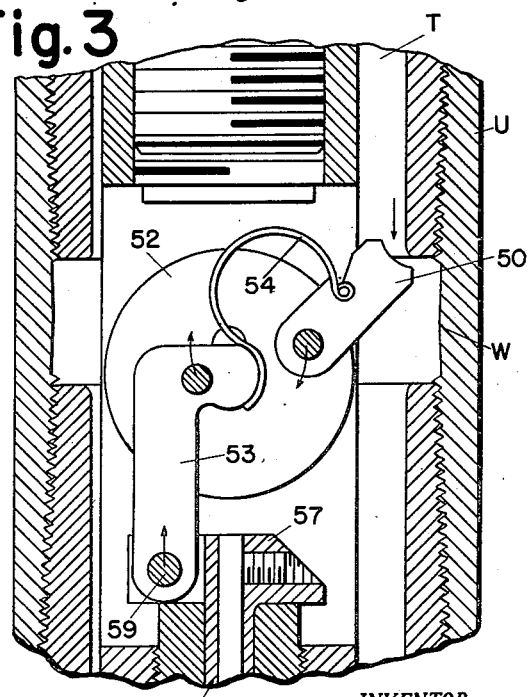
INVENTOR.
JOHN V. FREDD
BY
Busser and Harding
ATTORNEYS May 13, 1952  J. V. FREDD  2,596,924
TUBING CALIPER WITH LATCH MEANS
Filed June 9, 1949  8 Sheets-Sheet 2
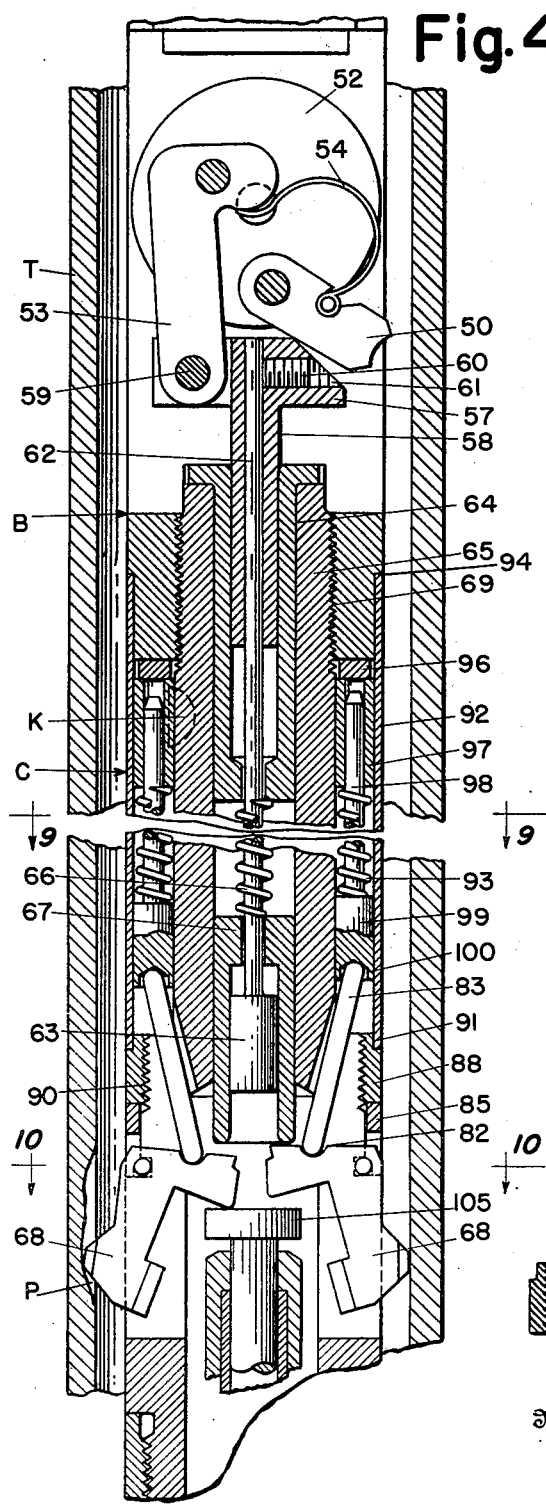
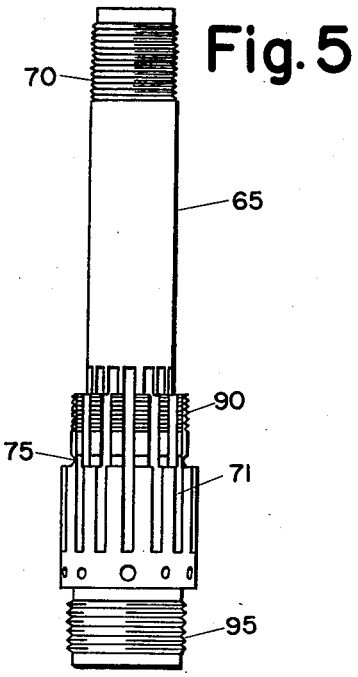
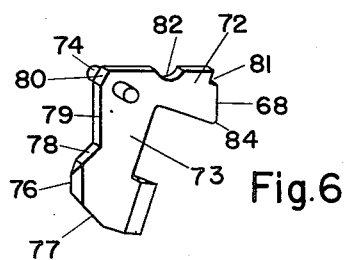
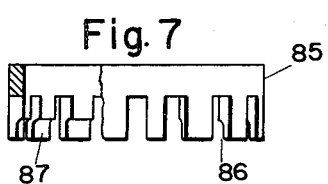
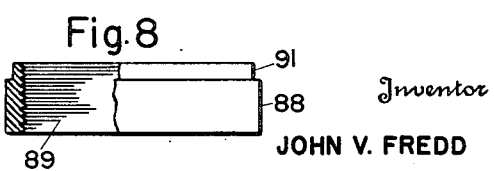
Inventor
JOHN V. FREDD
By Busser and Hardey
Attorneys May 13, 1952 J. V. FREDD 2,596,924
TUBING CALIPER WITH LATCH MEANS
Filed June 9, 1949 8 Sheets-Sheet 3
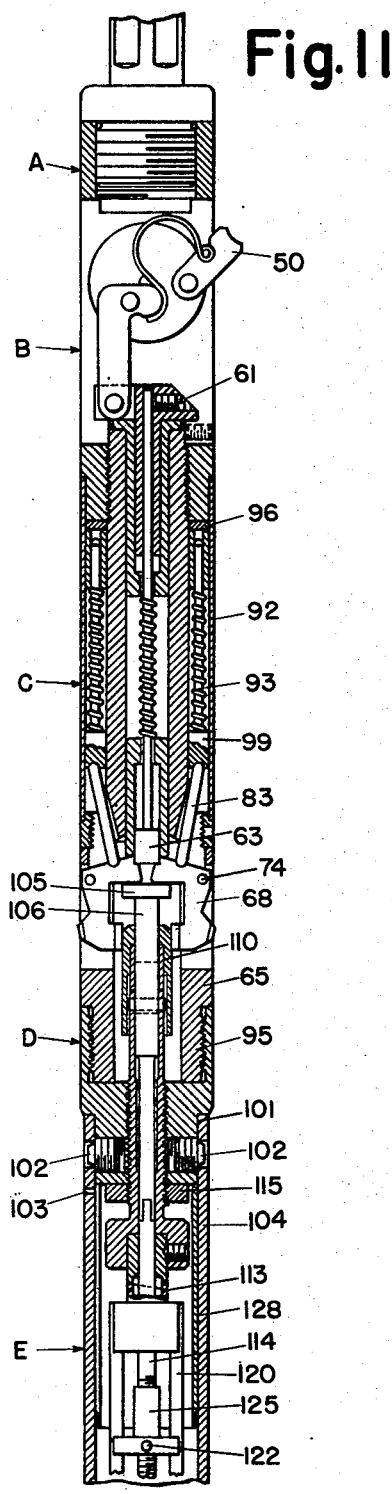
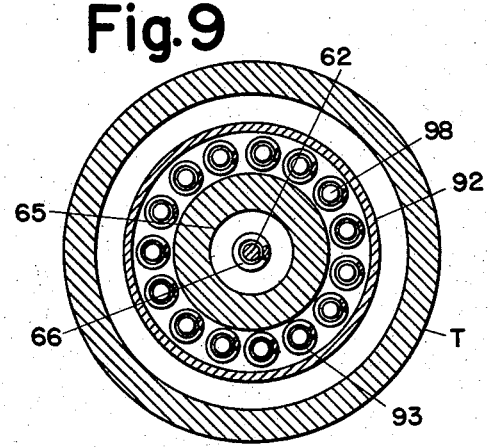
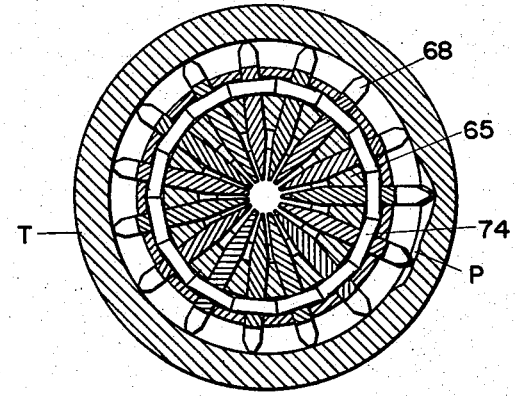
Inventor
JOHN V. FREDD
By Busser and Harding
Attorneys May 13, 1952 J. V. FREDD 2,596,924
TUBING CALIPER WITH LATCH MEANS
Filed June 9, 1949 8 Sheets-Sheet 4
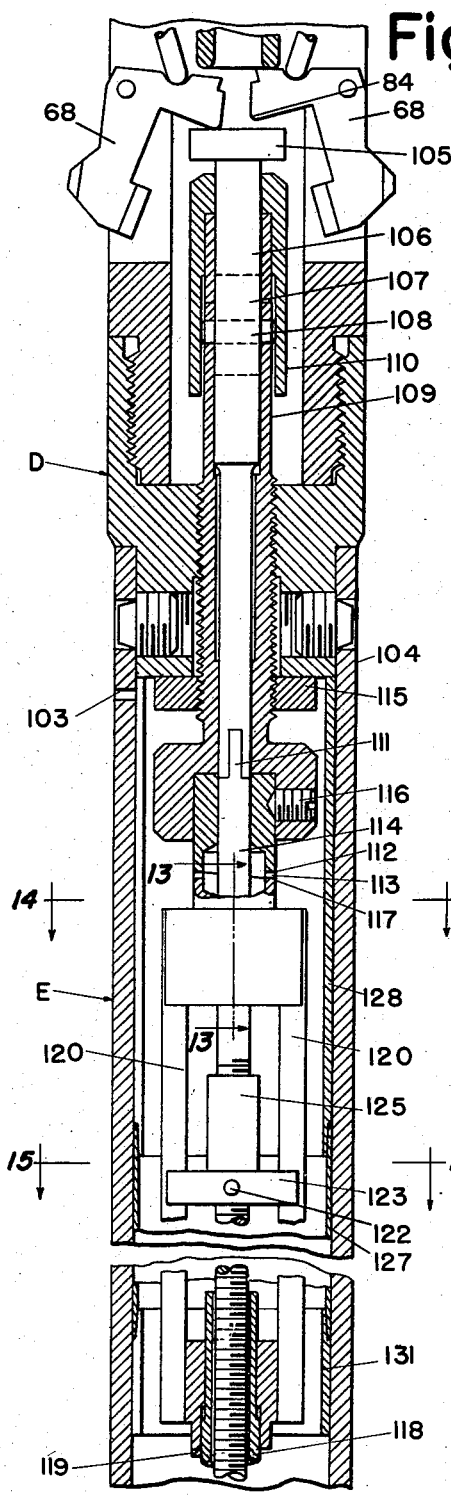
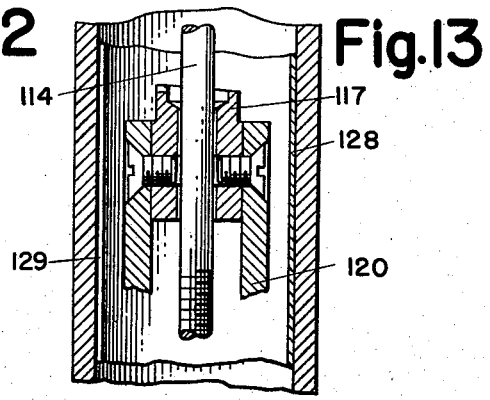
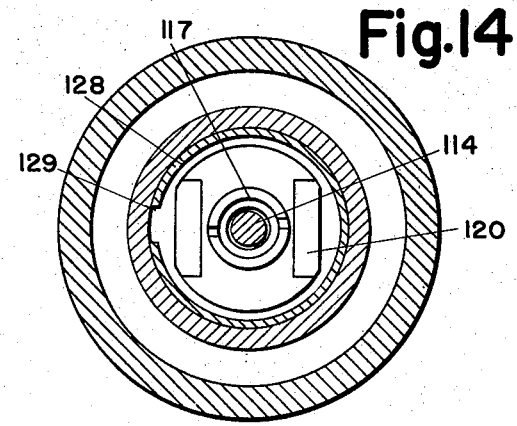
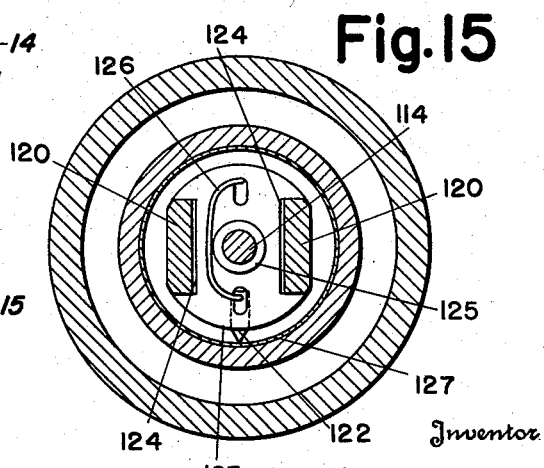
Inventor
JOHN V. FREDD
By Busser and Harding
Attorneys May 13, 1952  J. V. FREDD  2,596,924
TUBING CALIPER WITH LATCH MEANS
Filed June 9, 1949  8 Sheets-Sheet 5

*INVENTOR.*
JOHN V. FREDD
BY
*Brewer and Harding*
ATTORNEYS

May 13, 1952  J. V. FREDD  2,596,924
TUBING CALIPER WITH LATCH MEANS
Filed June 9, 1949  8 Sheets-Sheet 6

Inventor
JOHN V. FREDD
By Busser and Harding
Attorneys

May 13, 1952 J. V. FREDD 2,596,924
TUBING CALIPER WITH LATCH MEANS
Filed June 9, 1949 8 Sheets-Sheet 7
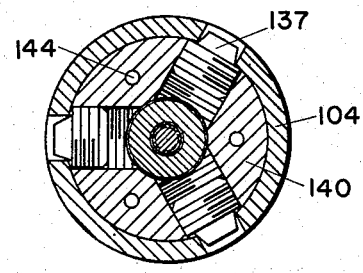
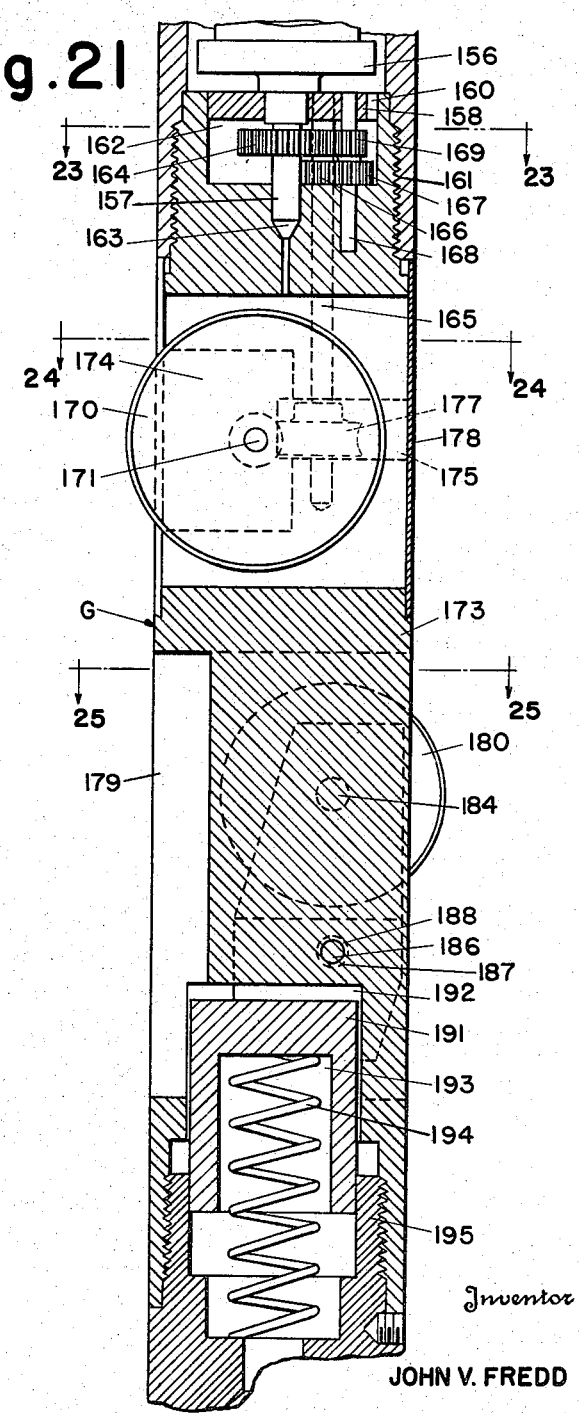
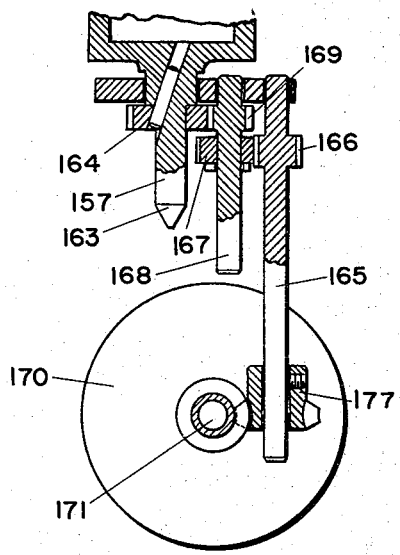
Inventor
JOHN V. FREDD
By Busser and Harding
Attorneys May 13, 1952 J. V. FREDD 2,596,924
TUBING CALIPER WITH LATCH MEANS
Filed June 9, 1949 8 Sheets-Sheet 8

Inventor
JOHN V. FREDD
By Busser and Harding
Attorneys

Patented May 13, 1952

2,596,924

UNITED STATES PATENT OFFICE 2,596,924

TUBING CALIPER WITH LATCH MEANS

John V. Fredd, Dallas, Tex., assignor to Otis Pressure Control, Inc., Dallas, Tex., a corporation of Delaware Application June 9, 1949, Serial No. 97,940

10 Claims. (Cl. 33—178)

The present invention relates to a device for simultaneously calipering and recording accurately the internal surface conditions of pipes, tubes and like conduits. The device has special utility in the determination of variations from the normal of internal surface configurations such as the inner surfaces of extended lengths of connected conduits, particularly oil well tubing.

It is well known that oil and gas well tubing becomes worn and corroded after periods of use, depending upon the operating conditions to which it is submitted. Many wells produce, in addition to oil and gas, salt water or water having a high acidic content which actively attacks and corrodes the tubing resulting in the formation of pits and depressions on the internal surfaces of the tubing. In addition to corrosion, scoring and wearing of the internal surfaces of the tubing is caused by the passage of well tools through the tubing and by the presence of foreign materials in the fluid flow. The indentations on the tubing walls resulting from the scoring and corrosion are sometimes so severe that the wall thickness of the tubing is reduced to such an extent that it cannot withstand the pressure of fluids flowing therethrough or support its own weight. Consequently, the tubing becomes ruptured or parted, frequently subjecting the casing and surface connections to excessive and dangerous pressures and necessitating its hazardous removal at great cost after the damage has been done. To prevent such failure of the well tubing, it is desirable periodically to determine the condition of the inner walls of the tubing in order that replacements can be made or proper precautions taken to prevent any of the tubing becoming ruptured.

Calipering devices which usually involve the application of electrical circuits, are now available for measuring variations in the internal surfaces of well tubing. However, devices of this type are not especially adapted for use with well tubing which is under pressure due to the practical difficulties incident to using cables and other electrical equipment which are required to effect the recording.

The present device is entirely mechanical in operation and is so constructed that it is readily utilizable with available equipment which is customarily used in auxiliary well operations, for example, such equipment as is used in tool "fishing," well surveying, running and pulling tubing safety valves, chokes, bottom-hole regulators, etc.

It is a principal feature of this invention to provide a calipering device which may be lowered or "dropped" as a unit by a suitable wire line into the tubing of a well under pressure and effect a continuous record of the internal surface configuration of the tubing as the device passes upwardly therethrough. After the device is removed from the tubing the continuous record is examined and from this record the extent of the defect and the exact location of the tubing lengths which must be removed and replaced are readily and accurately determined.

This is made possible by the design and arrangement of the calipering or feeler mechanism. This mechanism comprises a plurality of independently operated elements, each of which is actuated in accordance with any pit or depression which it encounters as the calipering unit is passed through the tubing. Upon the actuation of any of the calipering elements, a stylus which is positioned in recording relation to a cylindrical chart will be actuated and, consequently, each independent pit or depression is recorded. By arranging the calipering elements to be independently operable, variations from the normal inner radius of the tubing will be indicated, that is, as a pit or depression is encountered the calipering elements independently enter a pit or depression and a record is effected. The record, however, will show only the deepest pit encountered, since as mentioned before, the stylus is independently actuated by each feeler and of course the principal concern is with the worst corrosive area for a determination of tube removal.

In addition to being independently operable the calipering elements or feelers will operate as a group when a joint or connection between adjacent tubes is encountered. This latter function of the calipering elements is very important in the practical use of this invention, since the record effected for the jointures encountered will all be generally of equal magnitude and will appear at substantially equally spaced points on the recording chart. For example, consider a well tubing string of extreme length, such as from five to ten thousand feet, made up in thirty foot sections and joined together by internal or external collars. As the calipering unit is passed through the tubing and the joints are encountered, the calipering elements, acting simultaneously, will be forced inwardly or outwardly as a group, depending on whether the couplings for the tube sections are inside or outside couplings. Each time the calipering elements encounter a coupling of the well tubing the stylus member will be moved longitudinally of the chart substantially the same distance and the indications on the chart will be similar and equidistant, assuming the tube sections are of the same length. Therefore, the number of sections through which the calipering unit has passed as well as the particular section or sections which are corroded or pitted can be readily determined from the recording chart.

It will be understood from the above that the calipering portion of the unit is arranged to provide two complemental functions. An operator of the instrument can caliper tubing in wells of great depths and also determine, from the recording chart, the exact location of all pits or depressions encountered within the tubing, particularly those which may be considered hazardous to the further operation of the well tubing. It will further be seen that the calipering unit is designed to permit its construction to be varied for calipering different sizes of well tubing and that it is particularly adapted in its construction and arrangement of cooperating parts to be used with well tubing which is operated under high pressures.

The tube calipering device of the present invention differs from known devices in that a stationary cylindrical chart is provided to receive a record during the calipering operation and a helical record is effected through the simultaneous rotative and longitudinal movement of the stylus relative to the chart.

The rotative effect of the stylus is brought about through the medium of a drive wheel and two pressure wheels which are maintained in contact with the inner surface of the tubing and tend additionally to center the device therein. Suitable gearing and various other cooperating elements are positioned within a specially designed housing and located between the drive wheel and stylus.

The calipering elements in one useful embodiment are bell-crank levers and are located in the housing above the stylus. Each has a lateral arm which extends inwardly toward the axis of the housing and a depending arm which is disposed at an angle of 90° to the lateral arm. A spring is provided for each calipering element to exert pressure on the lateral arms and to force the depending arms outwardly of the housing to be in operative contact with the tubing during the calipering operation and, additionally, provision is made to maintain the calipering elements in retracted or nonoperating position as the device is initially passed downwardly through the tubing.

A lead screw is provided which is non-rotatable but is urged longitudinally of the housing constantly by a spring in a compartment located above the drive wheel, and urges a bearing surface constantly against the lower surfaces of the lateral arms of the calipering elements. A cooperating spring is positioned above the calipering elements and axially of the housing which forces constantly another bearing surface axially of the housing against the upper surfaces of the caliper lateral arms. The pressure of these springs above and below the lateral arms of the calipering elements provides an arrangement for centering the caliper in the tubing under all conditions.

In order that no substantial area of the internal surface of tubing which is being calipered be uncalipered or uninspected, a substantial number of the elements are utilized. It has been found, for example, when calipering tubing of about three inches in diameter, that fifteen calipering elements are required to caliper the complete internal surface of the tubing. This relatively great number of calipering elements requires that each be of a particular design in order that they can be carried by and disposed within a housing of sufficiently small diameter to be passed through such small diameter tubing. The calipering elements preferably terminate at their calipering ends in wedge shaped areas in order to reduce wear and also terminate at their inner ends in wedge shaped areas in order that these ends may be centered and effectively controlled by the springs heretofore mentioned.

In the drawings:

Figure 1 is an elevation of the calipering device.

Figure 2 is a partial elevation at right angles to Figure 1 of section shown by lines 2—2.

Figure 3 is a vertical section of Figure 2 on lines 3—3.

Figure 4 is a sectional elevation of the release assembly and feeler fingers.

Figures 5, 6, 7 and 8 are details of elements in Figure 4.

Figures 9 and 10 are cross-sections of Figure 4 on lines 9—9 and 10—10.

Figure 11 is a sectional elevation of the release, feeler and stylus assemblies.

Figure 12 is an enlarged detail in sectional elevation of the lower half of Figure 11.

Figures 13, 14 and 15 are sectional details of Figure 12 on lines 13—13, 14—14 and 15—15.

Figure 16:
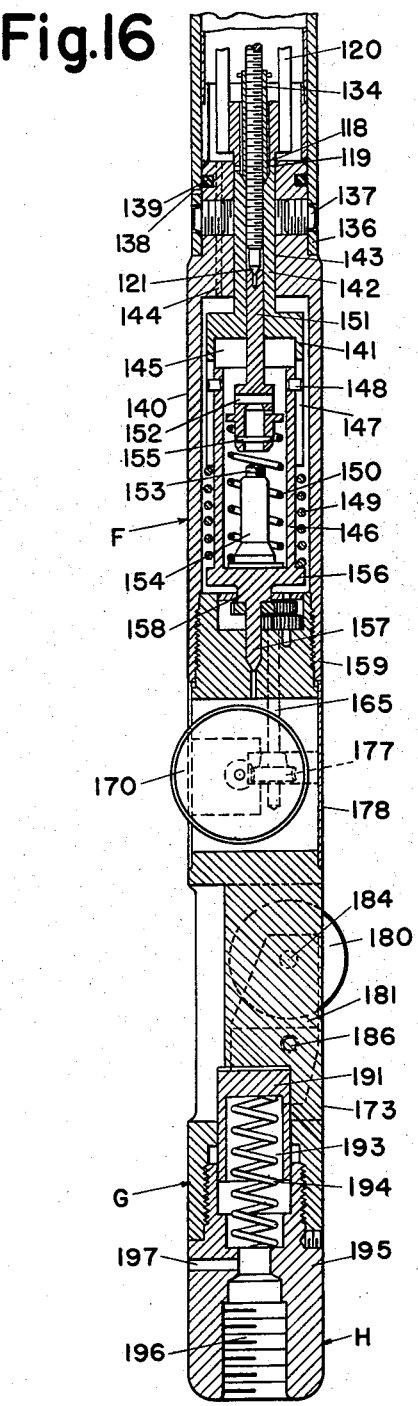

Figure 16 is a sectional detail of the driving mechanism.

Figure 17:
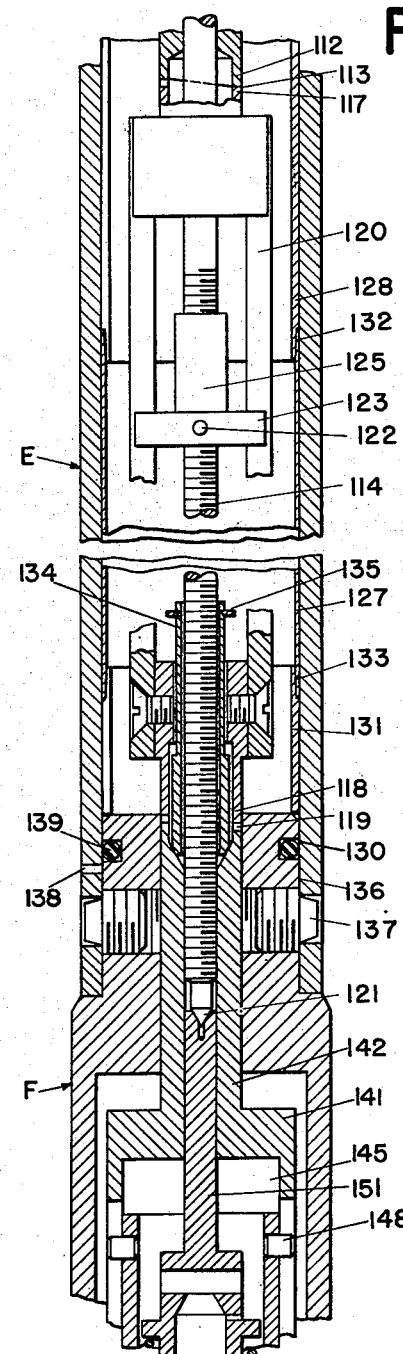

Figure 17 is an enlarged detail of the chart member.

Figure 18:
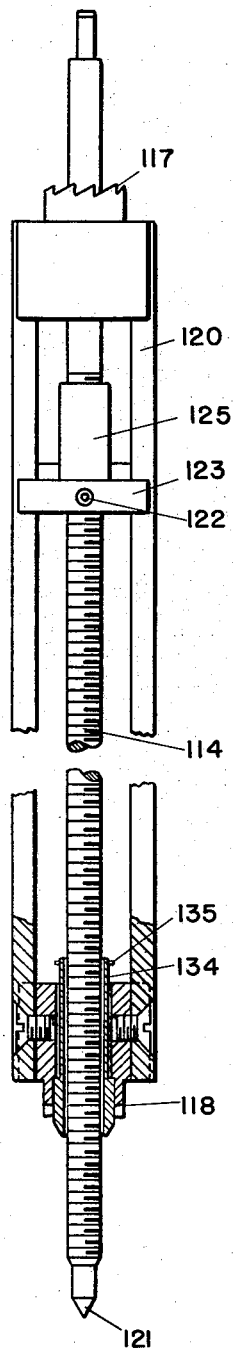

Figure 18 is a separate detail of the stylus mechanism.

Figure 19:
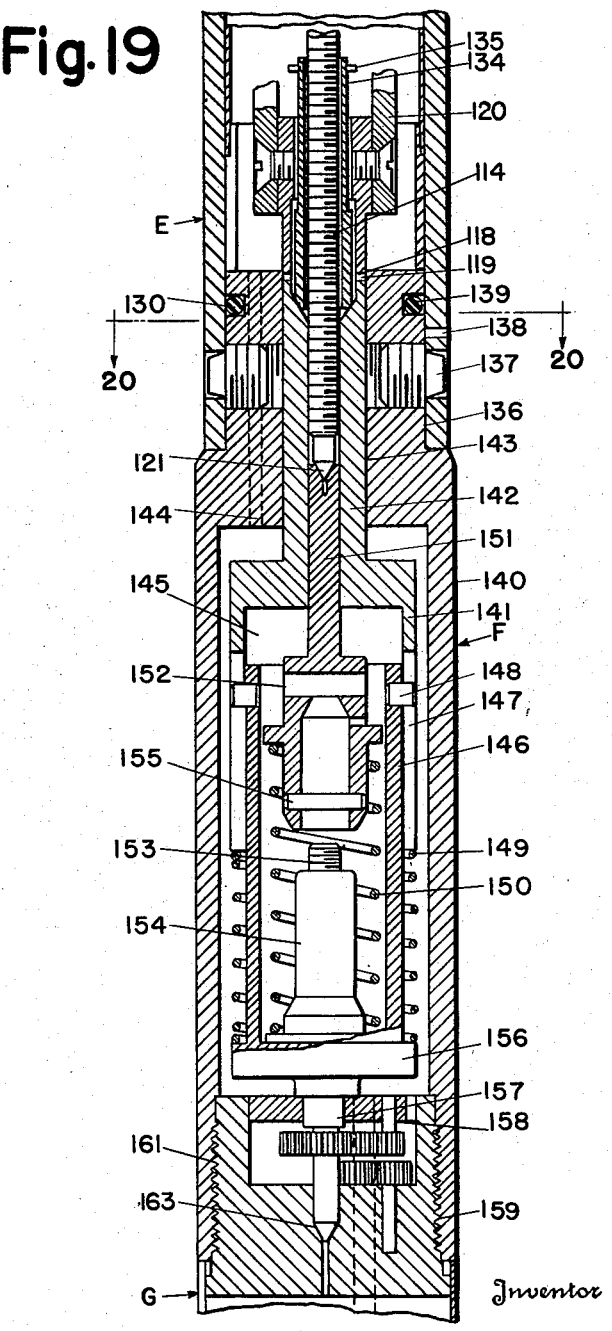

Figure 19 is a sectional detail of the driving ratchet assembly.

Figure 20 is a cross-section of Figure 19 on line 20—20.

Figure 21 is an enlarged section of the lower part of Figure 16.

Figure 23:
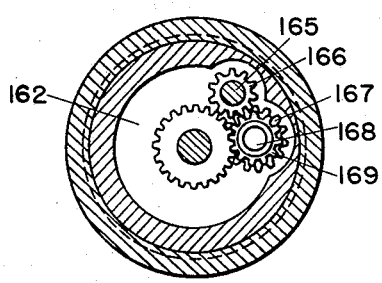
Figure 24:
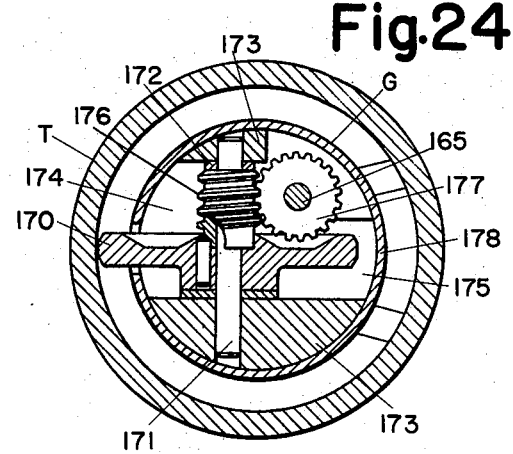

Figures 22, 23 and 24 are a development and sections of the driving gear train.

Figure 25:
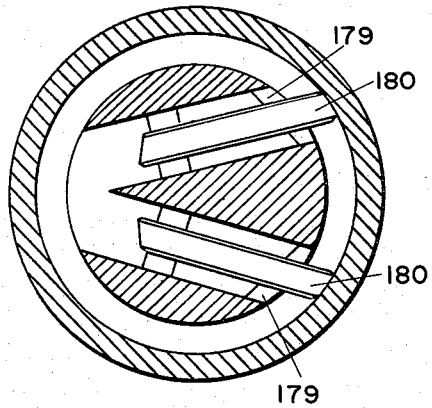
Figure 26:
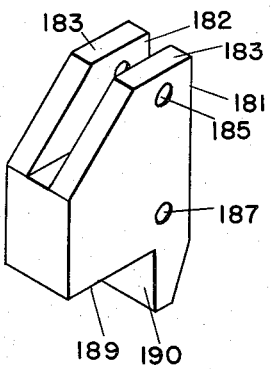

Figures 25 and 26 are details of the loading wheel mechanism.

The complete calipering instrument is shown in elevation in Figure 1 as it appears ready for insertion in the tubing string to be surveyed. Exclusive of the top sub A and bottom plug H, which connect the instrument to operating lines, rods and other tube measuring devices, it comprises six sections, as shown, which are detachable from each other for adjustment and inspection purposes. The release assembly B is housed in the upper section and threadably connects with the top sub A. Adjoining the release assembly B, the feeler head assembly C is shown divided into two parts which enables adjustment of the feeler mechanism as required under varying conditions. A stylus bushing assembly D is enclosed in the next lower section which is similarly readily disengaged for inspection and adjustment. The next lower section of the housing marked E encloses the chart on which the record of the calipering is marked and is referred to as the chart chamber. Between the chart chamber E and the stylus driving mechanism G, a ratchet assembly section F is inserted to protect the driven stylus mechanism and insure accurate records. At the bottom, plug H closes the end of the instrument housing and affords a connection for a second calipering device or other instrument. In describing the details of these sections, the instrument will be considered from the top to the bottom as here outlined, and the same numerals will be used to indicate like elements throughout the drawings.

Reference is made to Figures 1, 2, 3 and 4 for the details of the release assembly B and the connection between the release and the feeler head assembly C. Through a description of these figures the primary purpose of assembly B, which is to hold the feeler fingers 68 retracted until the survey is to begin, will be clearly understood. The releasing mechanism of the release assembly includes a dog 50 shown projecting from the body of section B in Figure 1. A side view of this section on lines 2—2 of Figure 1 is given in Figure 2 showing the transverse slot opening 51 in the instrument housing which permits the dog 50 to project outwardly on the opposite side. The cylindrical discs 52—52 retain the dog 50 and the release link 53, connected by a flat curved spring 54, in operating position. Figure 3, which is a cross-section of Figure 2 taken along line 3—3, shows the position of the dog 50, the latching link 53 and the flat curved spring 54 as the instrument is moving upwardly in the tubing string T. The dog 50 is projected outwardly and upwardly ready to engage the joint W of the tubing string T united by collar U. One of the discs 52 has been removed in order to show the relative positions of the elements of the release mechanism.

To release the feeler fingers to operating position, the motion set up by the dog 50 engaging a tubing joint is transmitted by the release link 53 to the head 57 of the release plunger 58 which is partially shown in Figures 2 and 3 but more fully detailed in Figure 4 to which reference is now made. The release link 53 is connected to the release plunger head 57 by pin 59. The end of the head opposite the connection at pin 59 is recessed to receive a set screw 60 and is bevelled on surface 61 to clear the dog 50 after it is forced down to the unlatched position by the rotation of discs 52—52. Within the release plunger 58 the release rod 62 is fastened by the set screw 60 and extends downwardly to terminate in the head 63 which, in the latching operation, engages notches in the feeler fingers and holds them in a retracted position (as shown in Figure 11) for running the caliper into the tubing string preliminary to the surveying operation. A bushing 64 retains the release plunger 58 slidably aligned in the feeler head 65 and acts as a retaining surface for the centering spring 66. After the feeler fingers are released, the head 63 of the locking piston 62 is lifted and held in position within the centering plunger 67 with which it is in slidable engagement in the bottom section of the feeler head 65. The centering plunger is moved downwardly within the body member by the action of spring 66 into contact with the feeler fingers 68 and urges them outwardly against the wall of the tubing with equal force, thus minimizing the errors which would arise due to the center line of the caliper moving away from the center line of the tubing string.

Continuing with reference to Figure 4 and referring also to Figures 5, 6, 7, 8, 9 and 10, the feeler head 65, referred to above, and the feeler head assembly section C of the calipering instrument will be described in detail. Standard machine shop operations have been used to produce an accurate and easily handled assembly locus for the feeler mechanism as shown by the stripped down feeler head in Figure 5. The thread 69 of release assembly B engages a like thread 70 on the feeler head and properly unites these two elements in operating position. The milled slots 71, annular groove 75 and threaded section 90 form the basic structure to receive the feeler fingers which explore the tubing wall. Coupling with the next lower section of the caliper is facilitated by thread 95.

The machined structure of the feeler head just described, is particularly adapted to support the feeler fingers and permit their explorations to be transmitted to a record chart. Consideration of the design and structural advantages of the feeler fingers will readily indicate the cooperation of the elements in this section. Figure 6 shows one of the feeler fingers 68 which is in the form of a bell crank with an inwardly extending arm 72 and a downwardly extending arm 73 pivoted by the pin 74. These pivoting pins are end ground to abut the adjoining pins as they rest in the annular groove 75 of the feeler head and are consequently positioned securely in circumferential relation. This construction permits the use of a greater number of fingers than could hitherto be used and also makes it possible to easily locate the feeler finger pins radially and axially with extreme accuracy. The feeler fingers of the rigid surface contact type, as distinguished from the well known roller type, are especially designed to be sensitive to pits in tubing which have heretofore been missed. By eliminating the feeler wheels, the required thickness of the fingers is reduced, making a more sensitive feeler and permitting the use of a greater number of them. The contact surface 76 is a tip of hardened steel or suitable alloy, such as Carboloy, fitted into the downwardly extending arm. In general, the profile of the contact surface is designed to simulate the action of a small diameter wheel in moving into and out of corrosion pits. The distance from the center of this imaginary wheel to pivoting pin 74 is the same as the distance from pivoting pin 74 to the center of the small radius which forms the contact surface 84 of the inwardly extending arms 72, and the angle formed by the lines connecting each center with the pivoting pin is 90°. This makes the radial motion of the contact surface 76 of exactly the same magnitude as the axial movement of the contact surface 84. As will be noted by reference to the several views showing the feeler fingers in retracted and operating positions, the several bevelled edges perform distinct functions. The lower bevelled edge 77 is angled to permit the downward movement of the calipering device to proceed freely without catching in the tubing joints when the fingers are extended, which is required if the caliper is dropped after initial release. The upward movement is likewise freely permitted by the angled edge 78. The edge 79 is cut to lie in the plane of the housing of the instrument when the fingers are in normal contact with the tubing while the edge 80 is flush with the housing when the fingers are retracted by the release mechanism preliminary to the start of a survey. To receive the head 63 of the locking piston 62 when the fingers are latched in the retracted position, a notch 81 is ground in the inwardly extending arm 72. An additional notch 82 on the top of the inwardly extending arm 72 is designed to receive the feeler rods 83 which spring load the individual fingers and extend them to contact with the tubing. By using this feeler rod construction, it is possible to install diameter, flat-rate springs and gain mechanical advantage when the feeler fingers approach top dead center, thus compensating for the spring load increase under compression through the piston and connecting rod action. However, to keep the feeler head centered in the tubing bore and maintain maximum accuracy, it is essential that the feeler point load increase slightly at a uniform rate as the feeler fingers move inwardly. Optimum load on the contact surface of the feeler fingers is thus achieved regardless of radial position. A rounded edge 84 is the contact through which the movement of the fingers is transmitted to the stylus which will be discussed later in detail.

Referring again to Figure 5, the annular groove 75 in the feeler head 65 is machined to receive the pivoting pins 74, which abut each other circumferentially as explained above. A retainer ring 85, detailed in Figure 7, with slots 86, and counter-bored as at 87, caps the feeler fingers and the pivoting pins and holds them securely in place. To hold the retainer ring in place and facilitate assembly of this element of the instrument, a nut 88, Figure 8, is internally threaded at 89 to engage like threads 90 on the feeler head. Enclosing the feeler head assembly is a sleeve 92 which fits into shoulder 91 on the nut 88, as the lower support and is received in a like shoulder 94 of the release assembly section B to support the upper end. Within the enclosed space defined by this sleeve and the feeler head are housed the feeler finger activating mechanism and means to adjust their operating force.

Returning to Figure 4 wherein these elements are shown in enlarged detail, immediately below the release assembly section B and secured thereby is a spacer washer 96 which may be varied in thickness to extend the spacing between the release assembly section and the feeler head assembly mechanism to vary the feeler spring compression and feeler point loading, either with or without a change in the length of the spacer sleeve. A guide ring 97, retained in radial position by a Woodruff key K, is mounted to receive the spring guides 98 and retain the individual feeler finger operating springs 93. These guides serve as the only means of keeping the springs from interfering with each other as they are located in an annular space with only small clearance between them. On the lower ends of the spring guides 98, the heads 99, aligned radially by the sleeve 92, abut the lower ends of the springs 93, cause the guides to move downward against the feeler rods 83 and thus transmit the thrust to the feeler fingers 68 as shown. This construction allows the greatest circumference of the device to be used for mounting of the spring guides 98 with the maximum perimeter spacing of the springs. In turn, this permits the use of springs of larger size, together with a greater number of feeler arms. The feeler rods 83 are rounded both at the top and bottom to seat in sockets 100 in the heads 99 of the spring guides and in the notches 82 in the inwardly extending arms 72 of the feeler fingers 68.

Figures 9 and 10 complete the detailed description of the feeler head assembly and are cross-sections taken on Figure 4 to clearly show the arrangement and location of the feeler arms and guides. The upper section shown by Figure 9 indicates the circumferential distribution of the guides 98 and the springs 93 about the feeler head 65. The centrally located release rod 62 is also shown properly positioned within the feeler head. Figure 10 is a cross-section taken below section 9 and demonstrates the position of the feeler fingers 68 in both the normal and extended operating positions as in entering a pit P. This latter cross-section is taken just above the pivoting pins 74 of the feeler arms 68 and shows all intersected parts in sectional symbol.

The next details of the caliper to be considered are the stylus bushing assembly D and the chart chamber section E which closely cooperate, both internally and externally, and will be described together. Reference is made to Figure 1 for the assembly and external appearance and to Figures 11, 12, 13, 14, 15, 16, 17 and 18 for a description of the internal elements and their cooperation. The stylus bushing assembly D threadedly engages threads 95 on the lower end of the feeler head 65 and is thereby properly positioned in the assembled instrument. It will be noted in Figure 1 that all threaded members are provided with shallow holes to receive spanner wrenches for making and breaking the joints as required for complete assembly and disassembly. Figure 11 gives the above threaded joint in detail and further shows the slip joint 101 of the chart chamber closure 104 where it joins the stylus bushing assembly. Chamber screws 102, made from hardened, fine-thread socket set screws with heads tapered down to fit tightly into holes in the chart chamber closure, complete this connection and prevent disengagement during operation. A pressure relief hole 103 is drilled through the chart chamber closure 104 to permit uninterrupted operation of the chart chamber elements during the survey which normally takes place under pressure conditions. Reference to Figure 16 shows the lower end of the chart chamber closure to be a duplication of the upper end just described so that in assembly either end may be placed upward and no mistake is possible.

The sections of the calipering device now under discussion are seen more clearly in Figure 12. Starting at the top of this figure with the feeler fingers 68, which have been described above in detail, the rounded edge 84 of the under side of the inwardly extending arms 72 are normally in contact with the head end 105 of the stylus rod 106. In this view one of the feeler arms has moved outwardly to a greater degree than the other arm as on entering a pit or depression and is pressing the stylus rod downwardly. A slot 107 is let into the stylus rod 106 to pass the pin 108, mounted in the adjustable member 109 of the stylus bushing, which prevents rotation of the stylus rod yet permits the desired axial movement set up by the feeler fingers. A stop 110 abuts the end of the adjustable bushing member to prevent the upper edge of the stylus rod slot from striking and shearing the pin 108. As designed, the stop also prevents the pin from slipping out, thus preserving its primary function, namely, to prevent rotation of the stylus rod. Another slot 111 in the lower end of the rod 106, cut to receive the milled end of the stylus lead screw 114, permits ready disassembly without disturbing the fixed ratchet 112 of the stop clutch 113 and further prevents the stylus lead screw from rotating. The maximum diameter to which the feeler arms may be extended is adjusted axially within the device by the adjustable member 109 which threadedly engages the stylus bushing D, as shown. The locking nut 115 preserves this adjustment once it is made. The set screw 116 retains the ratchet 112 in fixed position.

Having described the stylus bushing assembly D down to the stop clutch, it is logical from the joints and physical construction to consider the elements immediately below this point as parts of the chart chamber section E. Starting with the internal construction the stylus rotating mechanism extends downwardly from the movable ratchet 117 of the stop clutch 113 of Figure 12 to the driven ratchet 118 of the driving clutch 119 in Figure 16. The assembled detail of this part of the mechanism is illustrated in Figure 17 and is separately shown in Figure 18. Sectional views, necessary to a complete understanding, are given in Figures 13, 14, and 15. With reference to Figure 17, the stop clutch 113 includes a fixed ratchet 112 and a movable ratchet 117. Attached to the movable ratchet are the drive rails 120 which extend downwardly to engage the driven ratchet 118 of the driving clutch 119. These driving rails are suitably fastened on both ends to the ratchet as shown in this figure. The non-rotatable stylus lead screw 114 is positioned through both clutches and is supported by the conical bearing 121. A stylus 122 is housed in the stylus holder 123 designed as a travelling nut and slotted at 124—124, as shown in Figure 15, to receive the drive rails 120 which rotate it about the lead screw 114. Forming a part of the travelling nut 123, a threaded extension 125 extends the threaded contact area over an added length of the lead screw for better operation and control. The stylus lead screw 114 is centrally positioned in this figure which also discloses the relation of the stylus holder parts together with the stylus spring 126 used to urge the stylus into contact with the surface of the chart 127. A single coil spring is used to load the stylus point more uniformly than could be done with a small diameter spring. Moving upward on Figure 12 of which Figure 15 is a cross-section, another section Figure 14 shows the movable ratchet 117 of the stop clutch 113 with the lead screw 114 passing through the center. The assembly of this clutch element and the drive rails 120, considered with the elevation of the stylus driving mechanism assembly as shown in Figure 18, clearly illustrates the arrangement of these elements. A section of the upper chart retainer 128, slotted at 129 to permit contraction and expansion to position and fasten the chart 127 in place, is included in the sectional view of Figure 14.

The circumferential dimension of the chart retainer 128 is such that, when in place as shown in Figure 14, the slot 129 is of sufficient width to cooperate with pressure relief hole 103 (see Figure 12) in chart chamber closure 104 to permit pressure equalization throughout the instrument during operation under pressure conditions. When the caliper is assembled care must be taken to locate slot 129 opposite hole 103 in order to permit the aforesaid pressure equalization.

Enclosed within this section E are the chart 127, chart retainer 128 and a similar retainer 131 in the lower part of the chart chamber and are clearly shown in details of Figure 17. The upper and lower chart retainers are bevelled on the edge toward the chart with a shoulder at points 132 and 133 respectively to wedge the chart in place and prevent any movement of the chart surface during the calipering operation. A disengaging device comprising a sleeve 134 slidably encircles the stylus lead screw near its lower end and freely fits within the driven ratchet of the driving clutch 119. The internal and external surfaces of the sleeve being smooth, no intended motion of rotation or retention are transmitted to it by the elements adjacent thereto. To keep the disengaging device from falling out of the driving clutch when the caliper is disassembled, a retaining ring 135 is fastened on the upper end. The length of this device is sufficient to extend through the upper ratchet of the clutch 119 and into the lower ratchet 141 in order to provide for transmitting pressure to the lower ratchet at the end of the stylus travel as will be fully discussed in describing the operation of the caliper.

At the upper end of the ratchet spring assembly F, adjoining the lower end of the chart chamber closure E, are a slip joint 136, chamber screws 137, and a pressure relief hole 138; all similar to the structure and like elements described for Figure 11 and, as pointed out there, intentionally so constructed to prevent mistakes in assembly. The O ring 139 is set into a groove 130 to retain the lubricant with which the chart chamber is filled.

Continuing downward in the examination of the details of the caliper, the ratchet assembly F is the next section to be detailed and is located externally in Figure 1 and internally in Figure 16 which sectionalizes the elements and indicates their operating relation. For the description of these elements general reference is made to these two Figures, 1 and 16, and special reference is made to Figure 19. In this latter figure, and continuing downward from the slip joint 136 by which the chart chamber section E and the ratchet spring assembly F are joined, the housing 140 is designed to receive the elements which transmit rotary motion to the stylus. The driving ratchet 141 of the driving clutch 119 comprises a reduced tubular extension 142 which terminates at the upper end with the ratchet teeth and extends axially through the bore 143 in the slip joint end of the housing 140. Equi-spaced holes 144—144—144 are drilled through this end of the housing, as shown in section in Figure 20, to permit the transfer of lubricant between the chart chamber section and ratchet spring assembly. The lower end of the driving ratchet 141 is an enlarged bored section 145 telescoping with the driving member 146. In the walls of the section 145, longitudinal slots 147 are cut to slide over and engage pins 148 on the driving member 146 insuring rotational movement of the driving ratchet. A ratchet spring 149 envelopes the driving member 146 and urges the driving ratchet 141 upward to engage the ratchet teeth with the driven ratchet 118. Enclosed within the member 146, the stylus lift spring 150 exerts an upward pressure on the stylus lead screw plunger 151 which supports the stylus lead screw 114 in the conical bearing 121. The section of the plunger adjacent spring 150 contains the upper section of a fluid flow control 152 which, cooperating with the adjustable screw stop 153 mounted in the stand 154, cushions the downward stroke of the lead screw 114, by decreasing the flow path of lubricant filling this part of the device. The pin 155, placed diametrically across the flow control 152, limits the downward movement of the lead screw after the speed of travel has been decreased by the upward movement of the lubricant around the screw 153 and through the controls. The adjustable screw stop is adjusted to halt the downward travel of the lead screw only after the feeler arms have been permitted to reach their maximum outward movement. The base 156 of the driving member 146 is flanged to support the spring 149 and is machined down to a shaft 157 with a conical bearing 163. At the lower end of the housing 140 the thread 159 connects the ratchet spring assembly section F to the drive mechanism section G.

Details of the flanged base 156 of the driving member 146 and the bearing plate 158, drilled at 160 to permit lubricant to pass downward, are repeated in Figure 21 which shows the details of the driving mechanism in section G. The upper threaded end 161, adapted to engage the threads of the section above, is counterbored to form the gear chamber 162. Supported by the bearing 163, the shaft 157 of the driving member 146 is fitted with the gear 164 which forms part of a gear train fully developed in Figures 22 and 23. By reference to these figures as well as Figure 21 now under discussion, it will be understood how the rotary motion of shaft 165, transmitted by gear 166 which is keyed thereon, is passed through gear 167 to shaft 168 and thence through gear 169 to gear 164 on the shaft of the driving member. A fuller understanding of the origin of the rotary motion, which is imparted to the shaft 165 and sets the gears in motion, will be understood by referring to Figure 24 in conjunction with Figure 21. The drive wheel 170, which is rotated by contact with the inner wall of the tubing string as the calipering instrument is raised or lowered, is rotatably mounted on a fixed shaft 171. Interposed between the rotatable drive wheel and the solid body portion 173 of the drive mechanism section G, through which the lateral slots 174 and 175 are machined to mount the worm gear and the drive wheel respectively, the brass washer 172 is mounted to reduce wear. The worm gear 176 is secured to the drive wheel in the slot 174 and meshes with the worm wheel 177 which is keyed to the bottom of the shaft 165. A sleeve 178, split on the line of the edge of the drive wheel 170 to permit its free rotation, is fitted over the slotted portion of the solid body 173 to close these assembly openings. In the lower part of the drive mechanism body 173, intersecting slots 179—179 are milled to receive the two loading wheels 180—180 as shown in Figures 21 and 25. These wheels are bevelled on the contact peripheries to conform to the arc of the inner wall of the tubing string and thus insure maximum contact area and constant pressure. Each of the loading wheels 180—180 is rotatably journaled in a loading arm of the design shown in Figure 26, and each loading arm is, in turn, pivotally mounted within the intersecting slots. As will be seen in Figure 26, each loading arm 181 is slotted at 182 providing a space between upstanding walls 183—183 which receive a loading wheel 180. The loading wheel is rotatably mounted on a shaft 184 which extends through the holes 185 of the loading arm. Retaining each loading arm in place within the slots 179—179, a pivot pin 186 passes through the hole 187 in the loading arm and the holes 188—188 drilled in the body 173. The bottom of each loading arm is cut to provide shoulders 189 and 190, the former spring pressed upwardly by piston 191 which fits into the drilled hole 192 in the bottom of the drive mechanism body 173 and the latter acting as a check against unrestricted outward movement of the loading arm. The bore 193 within the piston contains a spring 194 which is the activator for the piston and is maintained under compression by the plug 195 threadedly engaging the lower end of the body member 173.

Returning to Figure 16 to complete the description, the plug H is shown as centrally drilled and tapped at 196 to receive additional tools or another calipering instrument if it is desired to use these devices in tandem. A hole 197 may be drilled through the plug 195 to admit well fluids to the piston chamber if desired.

It is believed the detailed description above will be sufficiently understandable to those versed in the art to visualize the operation of the device. However, as the cooperation of the elements above defined gives a long sought for result with a high degree of accuracy and exceptional performance characteristics were noted under test, an example of the calipering of a tubing string under pressure conditions will be related. This instrument is designed to operate under high pressures if necessary without killing the well, and in the presence of any well fluids or gases, including salt water and drilling muds. The elements of the caliper, for use under such general conditions, are made to be highly corrosion resistant, either by making the parts of stainless steel or Monel metal, or by cadmium or chromium plating hardened tool steel. It will be further understood that special equipment for introducing the calipering device into wells under pressure is necessary. Among the items used for such equipment may be named hoisting and reeling machines, depth gauges, high pressure stuffing boxes, pressure chambers known to the trade as "lubricators," gate valves and the like, which are merely referred to here as they form no part of the claimed invention.

Preparatory to using the calipering instrument for a tubing string survey, it is possible to separate it into its component parts as shown in Figure 1 and make a thorough check of the mechanism for undue wear and operability. This is a feature of the device and requires very little time and a minimum of standard tools. All parts of the apparatus are readily accessible and easily adjusted or replaced. The usual preparation for a calipering run is limited to separating the instrument at the slip joint 101 which unites the stylus bushing assembly D with the chart chamber E and lifting the lead screw and stylus operating mechanism (Fig. 18) from the chart chamber. The used chart, if any, is removed and a new chart, which may be of any preferred material but in this example is made of sheet steel shim stock properly treated on the tracing face to be marked by the stylus 122, is inserted in the chart chamber and held securely by upper retainer 128 and the lower retainer 131, as shown in Figure 12. These retainers position the chart axially and hold it flat against the chamber wall, preventing any movement of the chart. To place the stylus in a position ready for operation, the stylus holder is rotated until it is at the top of the lead screw and the upper edge of the chart, also illustrated in Figure 12, and the stylus operating mechanism is put back in the chart chamber being sure the lead screw and driving clutch are properly positioned. Lubricating oil is then poured into the chart chamber until the ratchet assembly and chamber are filled to keep well fluids at high pressures from affecting the internal mechanisms, and then the device is reassembled by connecting the stylus bushing to the chart chamber at the joint previously separated. This slip joint, which is typical of similar connections used in this instrument, is made rigid by using chamber screws 102 which are tapered, socket setscrews. On disassembly they are rotated into the stylus bushing body and on reassembly they are backed out after the joint is united to fit firmly in holes drilled to receive them in the chart chamber closure 104 (Fig. 11). As the full well pressures are admitted to all parts of the caliper mechanism, including the recording stylus and chart, and equalized throughout by means of the lubricant filling these spaces, packing glands and gaskets with their inherent frictional drag are eliminated. The result of the equalization and balancing of the well pressures is that the stylus follows the smallest variation of each feeler arm as they explore the inner wall of the tubing string. The lubricating oil is retained within the caliper by the synthetic rubber O ring gasket set in the groove at the lower chart chamber joint positioned there to prevent leakage. The feeler fingers are then pressed into the retracted position and held there while the head of the release rod 63 is lowered into locking engagement with the notches provided in the feeler fingers by rotating the cylindrical discs 52 which also places the dog 50 in the locked position. The feeler fingers being urged outwardly by the piston like action of the feeler rods 83, as shown in Figure 12, press against the release rod head 63 and remain locked until the release rod is lifted. The caliper is now ready to survey the tubing string of our example.

By arranging the pressure retaining equipment enumerated above, and properly mounting it on the tubing string at the top of the well, the caliper is introduced into the tubing string on a wire line without pressure loss. The caliper is then lowered to the desired depth, the feeler fingers remaining in the retracted position, as described above, during the entire descent. The dog 50, projecting outwardly of the release assembly body and upwardly as shown in Figure 1, is held in light engagement with the wall of the tubing by the action of spring 54 and has sufficient movement to pass freely downward without disturbing the release mechanism. It is retained in this locked position by the load of the feeler fingers pressing against the head of the release rod. On reaching the desired depth, upward movement of the instrument engages the dog 50 in the first tubing joint above the stopping point and causes the release assembly to function, starting as shown in Figure 3 and ending as in Figure 4, lifting the release rod 62 from locking engagement with the notches 81 in feeler fingers 68, permitting them to spring outwardly to contact the tubing walls and begin the calipering operation. The pair of discs 52—52, having rotated to lift the release rod, drop the dog downward to lay on the bevelled head of the release plunger where the flat release spring 54, having travelled "overcenter," is desired to keep the dog confined within the release assembly body. At all times, the centering plunger 67 is urged downwardly by the compressed centering spring 66, restrained in upward movement by the bushing 64 above, to constantly engage the upper edge of the inwardly extending arms 72 of the feeler fingers 68. The constancy of this action by the plunger is illustrated in Figures 4 and 12 where it will be noted that the only time this is not true is when the individual feeler fingers separately follow pits P. This equal pressure on all the feeler fingers, under normal conditions and on the greater number where pits are encountered, centers the caliper within the tubing string and minimizes errors in the charted record which would otherwise arise.

In addition to the uniform spring pressure of the centering plunger on the feeler fingers, each finger is separately actuated outwardly by the feeler rods 83 which transmit the pressure of the spring guides 98 to each of the fingers separately. The outward movement of each individual finger is limited only by the tubing wall. The caliper is adjusted so the extreme diameter reached by the fingers is the same as the inside diameter of the tubing couplings or collars U. This setting is large enough to indicate complete penetration of the tubing by corrosion and serves as a reference in making an accurate interpretation of the actual depth of corrosion as indicated by the chart. Also, this setting is small enough to permit easy entry of the caliper into the surface connections of the well and to travel downward through the tubing couplings if the feeler arms are not in the retracted or locked position, as required in repeating surveys over limited tubing lengths. The ideal feeler finger loading is the minimum loading attainable which will minimize the wear on the feeler finger contact surface 76 and possible damage and yet produce an accurate chart if only one feeler finger moves out to its maximum travel. An individual feeler operating spring 93 should be strong enough to move its feeler finger firmly out to its limit of travel while at the same time depressing the stylus lift spring 150 (Fig. 16). In turn the stylus lift spring must be of sufficient strength to support the lead screw 114 and stylus holder 123 and keep the head of the stylus rod 105 in continuous contact with the feeler fingers even when the feeler fingers are moving into and out of corrosion pits and tubing collars at fast calipering speeds. The feeler spring compression and consequent feeler finger loading can be adjusted by changing the thickness of the spacer washer 96 and the length of the spacer sleeve 92 or either.

During the downward movement of the caliper in the tubing string, the loading wheels 180—180 and the drive wheel 170, Figure 16, are in operating contact with the tubing wall and rotating at a speed commensurate with the rate of movement downward. The direction of rotation of the drive wheel is clockwise when viewed as in Fig. 16 and is transmitted through the worm and worm wheel to the gear train and thence to the shaft 157 which rotates the driving member 146 and through it the driving ratchet 141. Centering of the caliper within the tubing string is facilitated by using two loading wheels and pressing these outward to contact the tubing wall by a single spring and plunger acting as a unit on both wheels equally. The driving clutch 119 is designed to cooperate with the stop clutch 113 (Fig. 11) so as to hold the stylus rotating mechanism motionless as the caliper moves downward. Consequently, no trace is made on the chart at this time. As the caliper is moved upward and the release operates, freeing the feeler fingers, the rotary motion of the drive and loading wheels is reversed. The clutches reverse their operation also, the driving clutch ratchets engaging and the stop clutch releasing the ratchets. A rotary motion is thus imparted to the stylus holder by the drive rails 120, Figure 17, and the stylus scribes the record on the chart, moving from the top of the chart downward. As the lead screw is fixed against rotation, the stylus 122 scribes a helix in descending along the lead screw thread. The scribed helix has the same pitch as the lead screw, with the result that the chart shows a series of parallel lines, equally spaced apart which aids in visually translating the survey. The horizontal scale of the chart is selected to provide maximum footage per chart while retaining clarity and to distribute tubing joint interruptions horizontally, and may be varied by changing the gears. In having the stylus move over the fixed chart, many more thousands of feet of tubing can be calipered at one time than if the chart moved and the stylus were stationary within the same dimensional limits of the chart chamber.

The helical movement of the stylus is interrupted by the action of the released feeler fingers which are now exploring the inner wall of the tubing for pits and joints. A pit in the tubing permits one or more of the feeler fingers to move outward, Figure 4, and at the same time, to press downwardly on the stylus rod 106. It will be noted that should two or more feeler fingers move outwardly at the same time, the effect of that which moves out the greatest distance is alone transmitted to the stylus rod. This reveals the locus and measurement of the greatest defect and is therefore a measure of the true damaged condition. The sum of the depths of the pits, depressions and joints, is never measured by this device. As the stylus rod is moved downward, this motion is transmitted to the non-rotatable lead screw with which it is in contact, Figure 11, and interrupts the helix which the stylus is scribing on the chart. The design of the feeler fingers detailed above causes the stylus to move away from the basic helical path the same amount as the feeler arms move outwardly. The resulting log, when the chart is removed from the caliper and spread out flat, is a series of parallel lines which show at true scale the maximum outward feeler movement at any instance during a calipering passage. The spacing of the lines, determined by the pitch of the lead screw, permits visual examination of the survey and exact measurement of the corrosion pits. For example, if the pitch of the lead screw were .050 inch, which is 20 threads to the inch, and the trace of a pit moves up three lines, the pit would be .150 inch deep. Tubing joints show clearly as a series of practically regular interruptions for standard length tubing and are readily identified for any length tubing. The chart lines will vary from almost straight to very jagged, depending on the severity of the corrosion. The lead screw, which receives the axial motion from the stylus rod, is supported by the plunger 151, as shown in Figure 17. A fluid flow control 152 is housed in the lower part of the plunger which, operating in the lubricant filling this part of the device and cooperating with the adjustable screw stop 153, restricts the travel of the lead screw to the effective limit and produces a clearer chart record.

A particular advantage of the disclosed device resides in the ability to re-caliper a specific length of tubing without removing the device from the string for re-setting. Within the limits of the chart space, readings may be repeated on a particular section of tubing as desired. It has been seen above that the calipering operation is performed only as the instrument moves upward in the string and that when moving downwardly the clutch arrangement is designed to prevent the rotation of the stylus holder. Consequently, a length of tubing may be surveyed by the upward movement of the caliper and re-surveyed until the chart is exhausted by dropping it down to the point of beginning and again surveying by moving it upward. The release mechanism, having once been unlatched, is not set again but presents no difficulty as the dog is dropped down and readily clears the tubing joints. The feeler fingers also clear the obstructions in the tubing string due to the several bevelled surfaces which have been fully described.

Should the instrument be operated beyond the chart limits, however, the record already obtained is preserved unmarred by the operation of the disengaging device 134, shown in detail in Figure 19. All recording action on the chart requires that the stylus rotate and move downwardly on the lead screw which is secured against rotation, but move axially in response to the feeler finger action, as described. Consequently, the survey will ultimately move the stylus holder to the bottom of the chart regardless of whether the run is continuous or repetitious as the clutch arrangement prevents the upward movement of the stylus on the lead screw even though the drive wheel is responsive to both upward and downward movement. Figure 17 shows the disengaging device 134 in enlarged detail and positions it in cooperating relation with the elements of the device which activate it and upon which it operates. The rotary motion of the drive rails 120 moves the stylus holder 123 downward on the lead screw 114 during the scribing operation until the bottom of the chart 127 is reached. At this point, the bottom of the stylus holder 123 engages the top of the disengaging device 134. Continued rotation moves the stylus holder further down on the lead screw and presses with increasing pressure on the disengaging device until it forces the driving ratchet 141 away from contact with the driven ratchet 118. The driving mechanism is then free to rotate without transmitting motion to the stylus driving mechanism from which it has been disengaged. The downward thrust of the stylus holder is transmitted to the lead screw with which it is threadedly engaged and exerts an equal upward thrust through the lead screw to the stylus rod 106, evident from an inspection of Figure 11, and, in turn, exerts an upward force on the feeler fingers causing them to retract sufficiently to withdraw from the tubing wall and facilitate removal from the string without unnecessary wear.

The surface operating crew keeps a running tally of the number of feet of tubing through which the survey is made by upward movement of the caliper. The fixed measurements of the chart length and lead screw pitch being known, the number of feet of tubing which can be calipered on one chart is readily determined. The survey having been made, the caliper is withdrawn from the tubing string in reverse operation to that described for starting the operation. The chart is released from the chart chamber and spread for study. Photostats are readily made from the chart, and enlarged if desired, for extensive interpretation and inclusion in survey reports.

The example selected for disclosing the operation of the caliper considered a well under pressure in which the tubing string was the object of the survey. This is not the limit of the operational possibilities of this device, and is not so intended. The calipering instrument, as here disclosed, is flexible in application and may readily be used to survey any conduit, pipe or tube in any position and under conditions ranging from atmospheric to very high pressures. Neither is the size of the instrument a controlling factor, but may be increased or decreased to meet specific conditions and will operate with equal facility and accuracy. It is, therefore, the intention of the inventor, to include within the scope of this disclosure all devices falling within the spirit of the invention, as well as the letter thereof, limited only by the appended claims.

The arrangement herein dislosed of a fixed recorder member and a movable stylus member, with driving and transmission means for effecting simultaneous rotation and longitudinal movement of the stylus member, is not herein claimed as that constitutes subject matter of my co-pending application, Serial No. 184,497, filed September 12, 1950, which is a division of the present application.

I claim:

1. In an internal tube wall calipering device adapted to be passaged through successive tube sections joined by couplings, the combination comprising an elongated housing, a plurality of calipering members mounted for lateral movement between said housing and the tube wall being calipered, said calipering members each having an inwardly extending part and a retractable outwardly projective part, resilient means for urging said retractable parts toward contact with the tube wall, latching means adapted to engage said inwardly extending parts and thereby maintain said outwardly projective parts retracted in opposition to said resilient means during passage of the device in a non-calipering direction, an outwardly projective dog pivotally mounted in the housing, means for resiliently urging the projective end of the dog outwardly toward contact with the tube wall, said end when in projected position being adapted to slide across said couplings as the device is passaged in a non-calipering direction and to engage adjacent a coupling upon passage in the opposite direction, and means actuated by such engagement for simultaneously retracting said dog and releasing said latching means for engagement with the inwardly extending parts of said calipering members.

2. In an internal tube wall calipering device adapted to be passaged through successive tube sections joined by couplings, the combination comprising an elongated housing, a plurality of bell crank calipering members mounted for lateral movement between said housing and the tube wall being calipered, said calipering members each having an inwardly extending arm and a retractable outwardly projective arm, resilient means for urging said retractable arms toward contact with the tube wall, latching means adapted to engage said inwardly extending arms and thereby maintain said outwardly projective arms retracted in opposition to said resilient means during passage of the device in a non-calipering direction, an outwardly projective dog pivotally mounted in the housing, means for resiliently urging the projective end of the dog outwardly toward contact with the tube wall, said end when in projected position being adapted to slide across said couplings as the device is passaged in a non-calipering direction and to engage adjacent a coupling upon passage in the opposite direction, and means actuated by such engagement for simultaneously retracting said dog and releasing said latching means for engagement with the inwardly extending arms of said calipering members.

3. A device according to claim 2 wherein the means that is actuated by engagement of the dog comprises a rotatable member to which said dog is pivotally connected, and linkage pivotally connecting said rotatable member with said latching means.

4. In an internal tube wall calipering and recording device adapted to be passaged through successive tube sections joined by couplings and comprising an elongated housing carrying calipering means mounted for lateral movement between said housing and the tube wall being calipered, recording means and mechanical actuating means for said recording means common to all of said calipering means, and responsive to movement thereof, the combination comprising a plurality of bell crank calipering members pivoted adjacent the periphery of the housing and each having an arm inwardly extending toward abutment with said common actuating means and a retractable outwardly projective arm, a plurality of resilient urging means within the housing located adjacent its periphery, an actuating member pivotally engaged at each end thereof and slanting inwardly from each urging means to the corresponding calipering member inner arm, latching means adapted to engage said inwardly extending arms and thereby maintain said outwardly projective arms retracted in opposition to said urging means during passage of the device in a non-calipering direction, a dog pivotally mounted in the housing and projective outwardly thereof, means for resiliently urging the projective end of the dog outwardly toward contact with the tube wall, said end being adapted to slide across said couplings when the device is passaged in said non-calipering direction and to engage adjacent a coupling upon passage in the opposite direction, and means actuated by such engagement for simultaneously retracting said dog from the tube wall and releasing said latching means from engagement with the inwardly extending arm of said calipering members.

5. The combination defined in claim 4 wherein each of said inwardly extending arms has a notch at its inner edge for reception of said latching means and another notch for pivotal reception of said actuating member, and wherein the means that is actuated by engagement of the dog comprises a rotatable member to which said dog is pivotally connected and linkage pivotally connecting said rotatable member with said latching member.

6. In an internal tube wall calipering device adapted to be passaged through successive tube sections joined by couplings and comprising an elongated housing carrying retractable calipering means mounted for lateral movement between said housing and the tube wall being calipered, the improvement comprising latching means adapted to maintain said calipering means in retracted position during passage of the device in a non-calipering direction through the tubing, an outwardly projective dog pivotally mounted in the housing, means for resiliently urging the projective end of the dog outwardly toward contact with the tube wall, said end when in projected position being adapted to slide across said couplings as the device is passaged in a non-calipering direction and to engage adjacent a coupling upon passage in the opposite direction, and means actuated by such engagement for simultaneously retracting said dog and releasing said latching means.

7. A device according to claim 6 wherein the means that is actuated by engagement of the dog comprises a rotatable member to which said dog is pivotally connected, and linkage pivotally connecting said rotatable member with said latching means.

8. In an internal tube wall calipering and recording device comprising an elongated housing carrying retractible calipering means mounted for lateral movement between the housing and the tube wall being calipered, the improvement wherein said calipering means comprise bell crank calipering members pivoted adjacent the periphery of the housing and each having an inwardly extending arm and a retractable outwardly projective arm, a plurality of circumferentially spaced urging means, one for each of said calipering members, located adjacent the periphery of the housing, and an actuating member pivotally engaged at each end thereof and slanting inwardly from each urging means to its corresponding calipering member inner arm.

9. In an internal tube wall calipering and recording device comprising an elongated housing carrying retractable calipering means mounted for lateral movement between the housing and the tube wall being calipered, an improved calipering means assembly which comprises a body member constituting a portion of the housing and having an extension of reduced cross section positioned longitudinally within the housing and forming therewith an anular space, said body member havig a plurality of circumferentially spaced slots and a circumferential groove adjacent the junction of said body member and its extension transversely intersecting said slots, bell crank calipering members having inwardly extending arms and outwardly projective arms retractable through said slots, pins at the pivotal loci of said calipering members positioned within said circumferential groove in abutment with each other, a plurality of urging means, one for each of said calipering members, located within said annular space, and an actuating member pivotally engaged at each end thereof and slanting inwardly from each urging means through the corresponding slot to the corresponding caliper member inner arm.

10. In an internal tube wall calipering and recording device comprising an elongated housing carrying retractable calipering means mounted for lateral movement between the housing and the tube wall being calipered, an improved calipering means assembly which comprises a body member constituting a portion of the housing and having an extension positioned longitudinally within the housing and forming therewith an annular space, said body member having a plurality of circumferentially spaced slots and a circumferential groove adjacent the junction of said body member and its extension transversely intersecting said slots, bell crank calipering members having inwardly extending arms and outwardly projective arms retractably operable in said longitudinal slots, pins at the pivotal loci of said calipering members positioned within said circumferential groove in abutment with each other, a plurality of urging means, one for each of said calipering members, located within said annular space, and an actuating member extending from each of said urging means to the corresponding caliper member inner arm.

JOHN V. FREDD.

REFERENCES CITED

The following references are of record in the file of this patent:

UNITED STATES PATENTS

| Number | Name | Date |
| --- | --- | --- |
| 713,784 | Mellor | Nov. 18, 1902 |
| 1,339,955 | Hardel | May 11, 1920 |
| 1,409,304 | Loomis | Mar. 14, 1922 |
| 1,676,848 | Au | July 10, 1928 |
| 2,040,501 | Sawford | May 12, 1936 |
| 2,102,080 | Kinley | Dec. 14, 1937 |
| 2,322,343 | Brandon | June 22, 1943 |
| 2,392,357 | Bays | Jan. 8, 1946 |
| 2,518,663 | Chaney et al. | Aug. 15, 1950 |